United States Patent
Wu et al.

(10) Patent No.: US 8,867,843 B2
(45) Date of Patent: Oct. 21, 2014

(54) METHOD OF IMAGE DENOISING AND METHOD OF GENERATING MOTION VECTOR DATA STRUCTURE THEREOF

(71) Applicant: Altek Semiconductor Corporation, Hsinchu (TW)

(72) Inventors: Chia-Yu Wu, Taichung (TW); Shih-Yuan Peng, New Taipei (TW)

(73) Assignee: Altek Semiconductor Corporation, Hsinchu (TW)

( * ) Notice: Subject to any disclaimer, the term of this patent is extended or adjusted under 35 U.S.C. 154(b) by 115 days.

(21) Appl. No.: 13/785,653

(22) Filed: Mar. 5, 2013

(65) Prior Publication Data
US 2014/0193080 A1    Jul. 10, 2014

(30) Foreign Application Priority Data
Jan. 8, 2013   (TW) .............................. 102100501 A

(51) Int. Cl.
*G06K 9/48*          (2006.01)
(52) U.S. Cl.
CPC ...................................... *G06K 9/481* (2013.01)
USPC ........... 382/197; 382/274; 382/275; 348/174; 348/208.4

(58) Field of Classification Search
USPC ........ 382/260, 274, 275; 348/154, 174, 208.4
See application file for complete search history.

(56) References Cited

U.S. PATENT DOCUMENTS

| | | | | |
|---|---|---|---|---|
| 8,059,207 B2 * | 11/2011 | Xu et al. | ........................ | 348/701 |
| 8,411,750 B2 * | 4/2013 | Dane | ......................... | 375/240.16 |
| 8,422,558 B2 * | 4/2013 | Bhaumik et al. | .......... | 375/240.16 |
| 8,533,062 B2 * | 9/2013 | Sauerwein | .................... | 705/26.3 |
| 8,582,882 B2 * | 11/2013 | Ernst et al. | ..................... | 382/173 |
| 8,761,262 B2 * | 6/2014 | Huang | ...................... | 375/240.16 |
| 8,781,302 B2 * | 7/2014 | Kogusuri | ...................... | 386/278 |

* cited by examiner

*Primary Examiner* — Yosef Kassa
(74) *Attorney, Agent, or Firm* — Muncy, Geissler, Olds & Lowe, P.C.

(57) ABSTRACT

The present invention discloses a method of image denoising and method of generating motion vector data structure thereof. The method comprises: providing an image sequential capturing module to capture and to receive the plurality of images; generating a global motion vector based on the plurality of images in accordance with a first algorithm; reducing each image as reduced images; dividing each of the first reduced images into a plurality of first areas and generating a first local motion vector based on each of the first areas in accordance with a second algorithm, and via the similar way for generating a second local motion vector; finally, obtaining motion vector data in the plurality of images according to the global motion vector, each of the first local motion vectors and each of the second local motion vectors.

10 Claims, 10 Drawing Sheets

METHOD OF IMAGE DENOISING AND METHOD OF GENERATING MOTION VECTOR DATA STRUCTURE THEREOF

CROSS-REFERENCE TO RELATED APPLICATION

This application claims the benefit of Taiwan Patent Application No. 102100501, filed on Jan. 8, 2013, in the Taiwan Intellectual Property Office, the disclosure of which is incorporated herein in its entirety by reference

BACKGROUND OF THE INVENTION

1. Field of the Invention

The present invention generally relates to a method of image denoising comprising local motion vectors and method of generating motion vector data structure thereof.

2. Description of the Related Art

While the object to be photographed is moving during the photographic process that the user tries to take a photograph of the object, the conventional image process can merely determine the motion of the object in accordance with the global picture plane. Therefore, the data for the conventional image process to determine the motion of the object is inaccurate. In addition, because the data for the conventional image process to determine the motion of the object is not accurate, the conventional image process does not have good performance when undergoing the denoising process of the image.

SUMMARY OF THE INVENTION

Based on the aforementioned problems in prior arts, one objective of the present invention is to provide a method of image denoising with local motion vectors and method of making motion vector data structure thereof to solve the problems of both the inaccurate data for the conventional image processing to determine the motion of the object in an image and bad performance at the denoising of the image.

In accordance with the objective of the present invention, a method of generating motion vector data structure is provided. The method comprises the following steps: providing an image capturing module to sequentially capture a plurality of images; providing an image processing module to receive the plurality of images, and generating a first local motion vector based on the plurality of images in accordance with a first algorithm; reducing each of the images as a first reduced image and a second reduced image respectively; respectively dividing each of the first reduced images into a plurality of first areas and generating a second local motion vector based on each of the first areas in accordance with a second algorithm; respectively dividing each of the second reduced images into a plurality of second areas and generating a global motion vector respectively based on each of the second areas in accordance with the second algorithm; and then obtaining motion vector data in the plurality of images according to the global motion vector, each of the first local motion vectors and each of the second local motion vectors.

In accordance with the objective of the present invention, a method of image denoising is further provided. The method comprises the following steps: sequentially capturing a plurality of images; generating a first local motion vector based on the plurality of images in accordance with a first algorithm; respectively reducing each of the images as a first reduced image and a second reduced image; dividing each of the first reduced images into a plurality of first areas, and generating a second local motion vector respectively based on each of the first areas in accordance with a second algorithm; dividing each of the second reduced images into a plurality of second areas, and generating a global motion vector respectively based on each of the second areas in accordance with the second algorithm; and proceeding a denoising process towards each the plurality of images in accordance with the global motion vector, each of the first local motion vector and each of the second local motion vector.

In summation of the description above, depending on the method of image denoising and method of making motion vector data structure thereof of the present invention, the accuracy of image processing for determining whether the object of image moves is improved, and the performance of it attends the best when denoising toward the image.

DETAILED DESCRIPTION OF THE PREFERRED EMBODIMENTS

With reference to the drawings thereafter, the preferred embodiments of the method of image denoising and method of generating motion vector data structure thereof in accordance with the present invention are illustrated. In order to be understood easily, the same component in the following embodiments is labeled as the same numeral.

Figure 1:
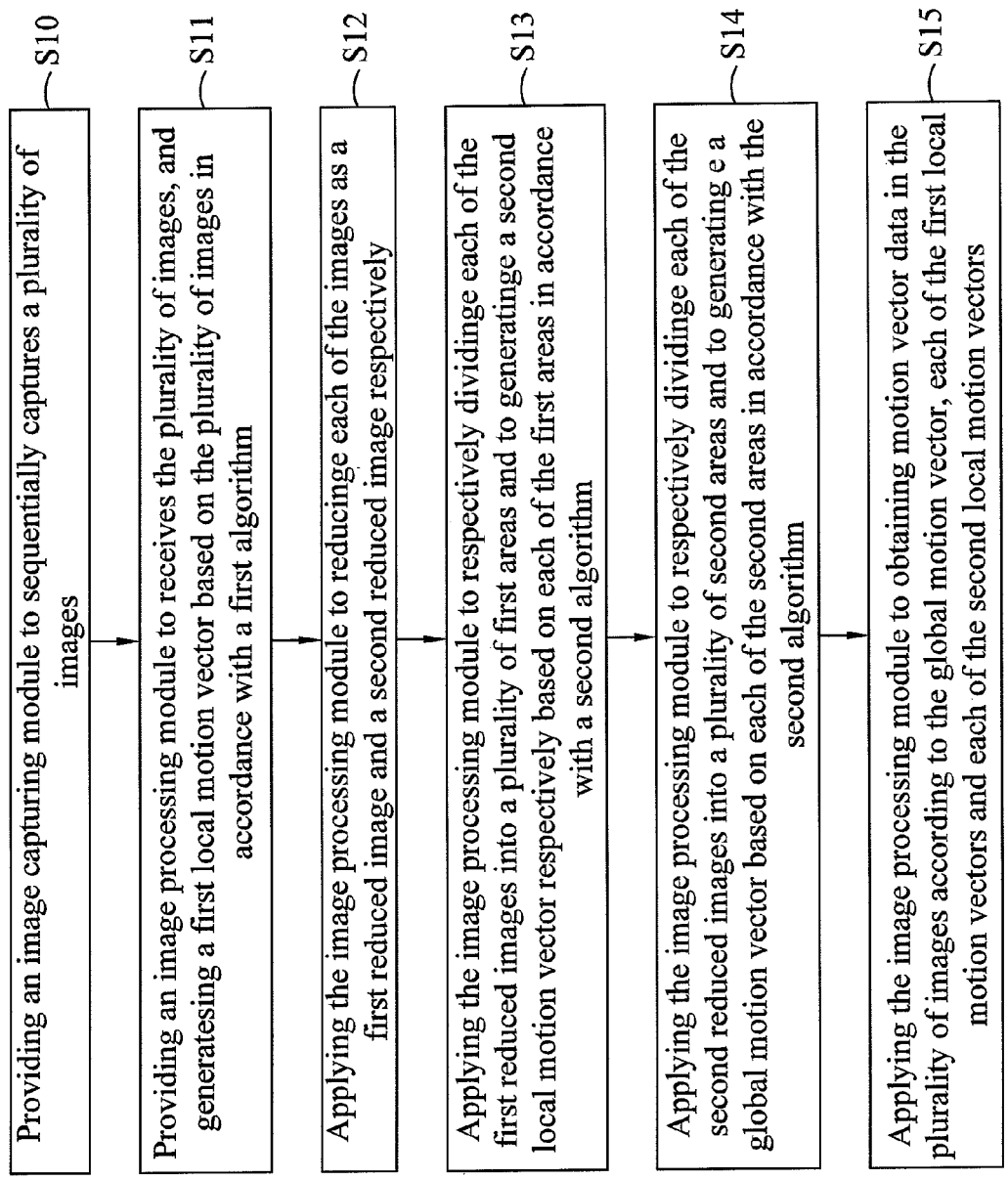
FIGS. 1-4 are four flow charts of the preferred embodiments of the method of making motion vector data structure of the present invention.
Figure 2:
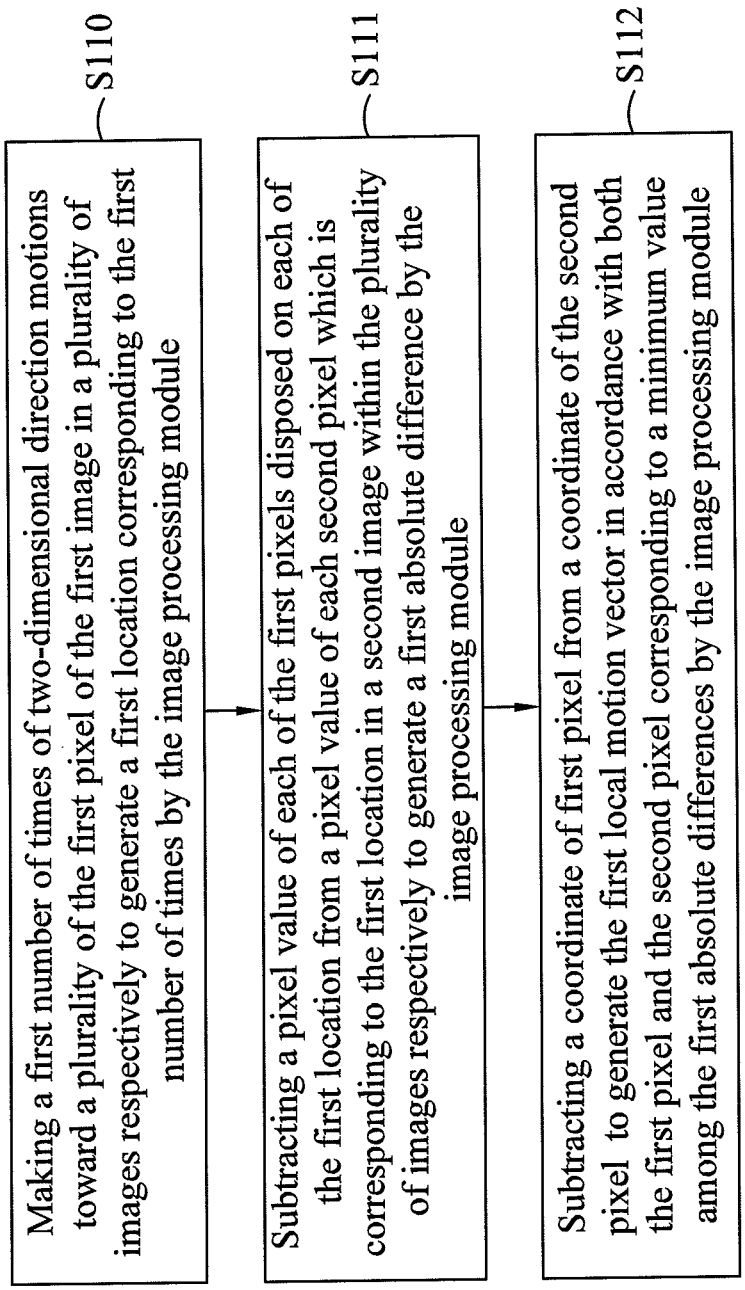
Figure 3:
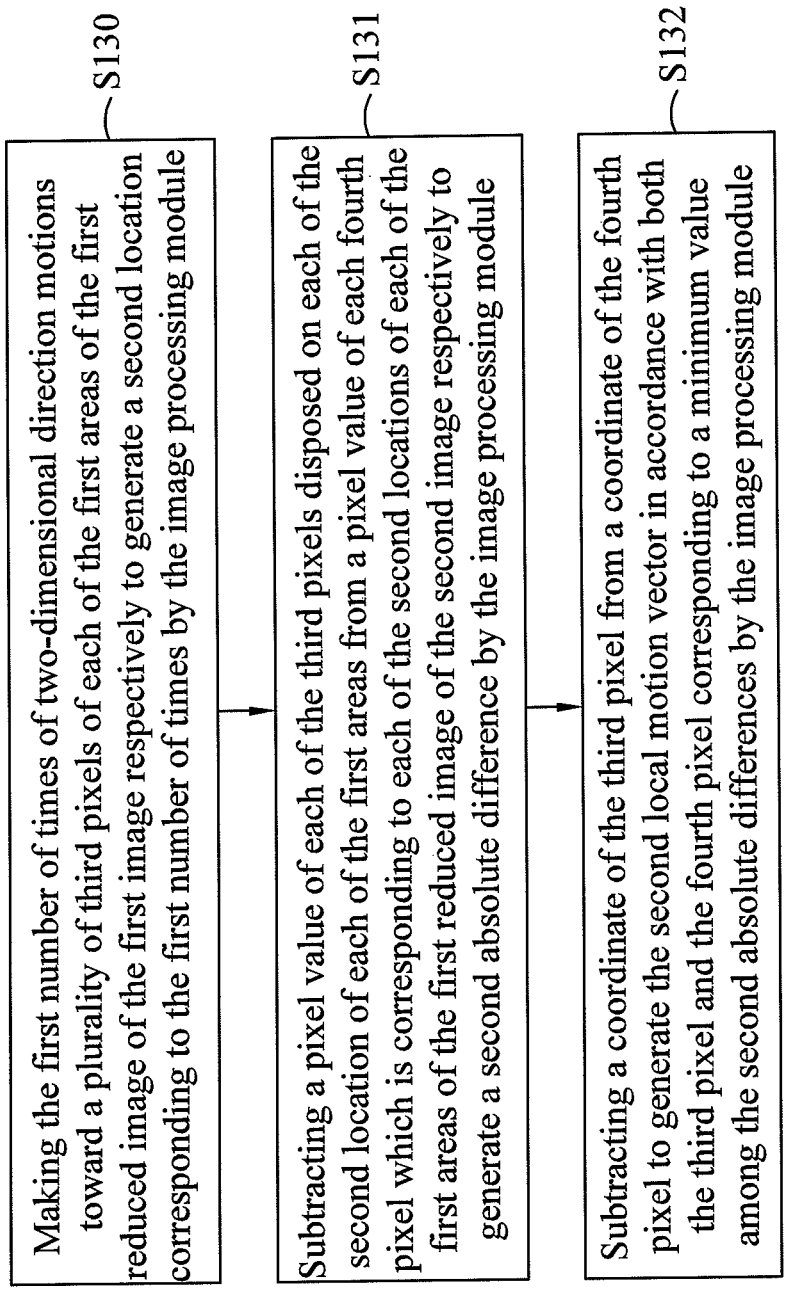
Figure 4:
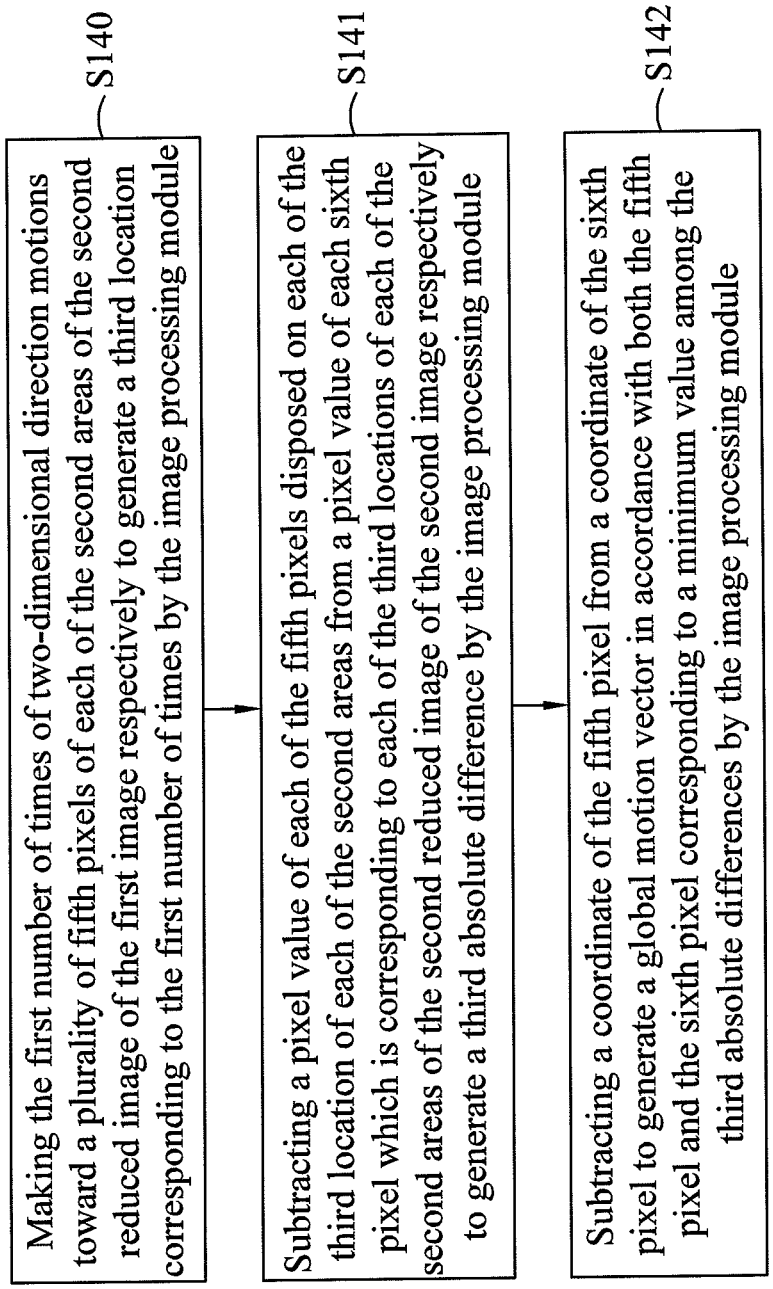
Figure 5:
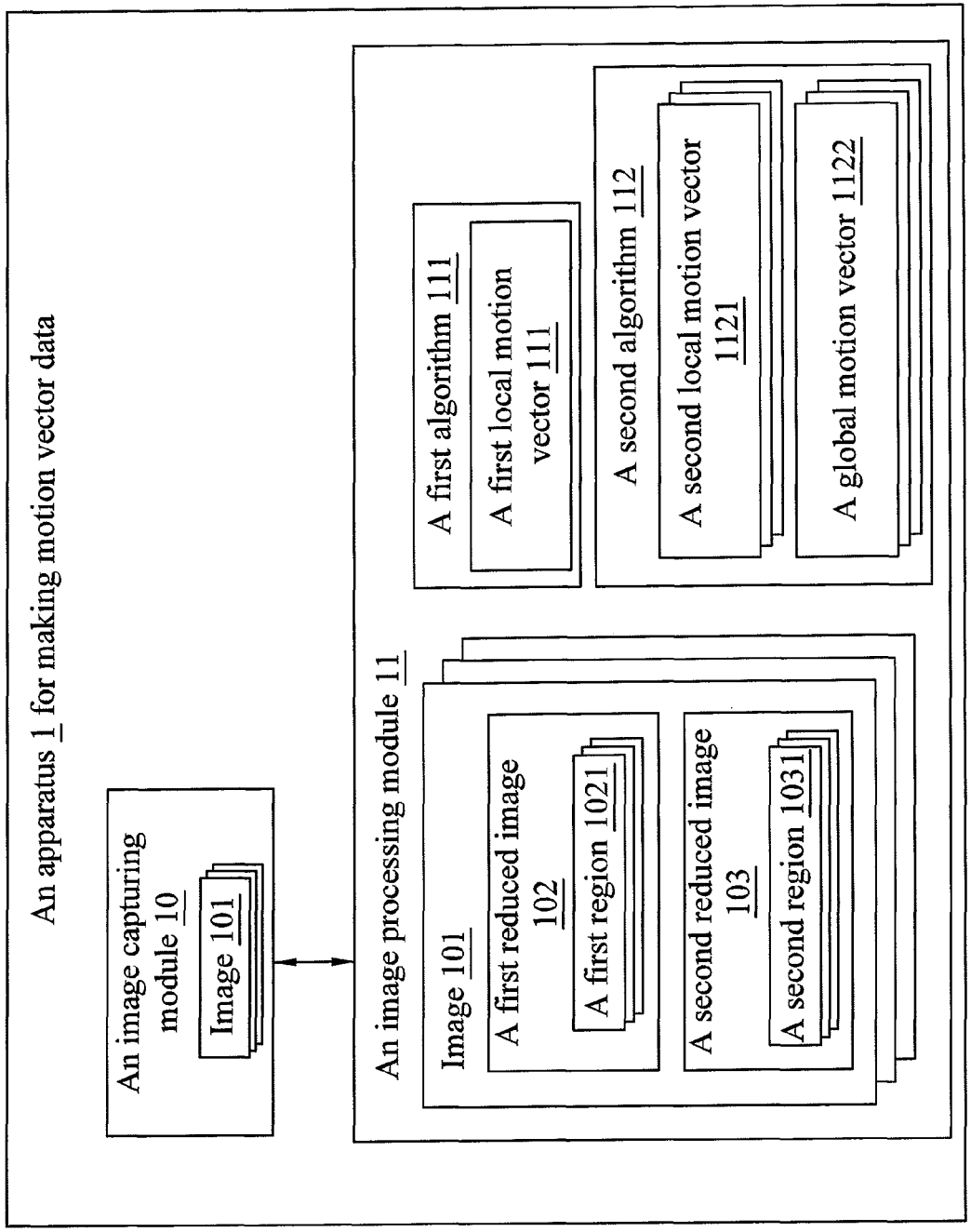
FIG. 5 is a schematic diagram of the apparatus for making motion vector data of the present invention.
Figure 6:
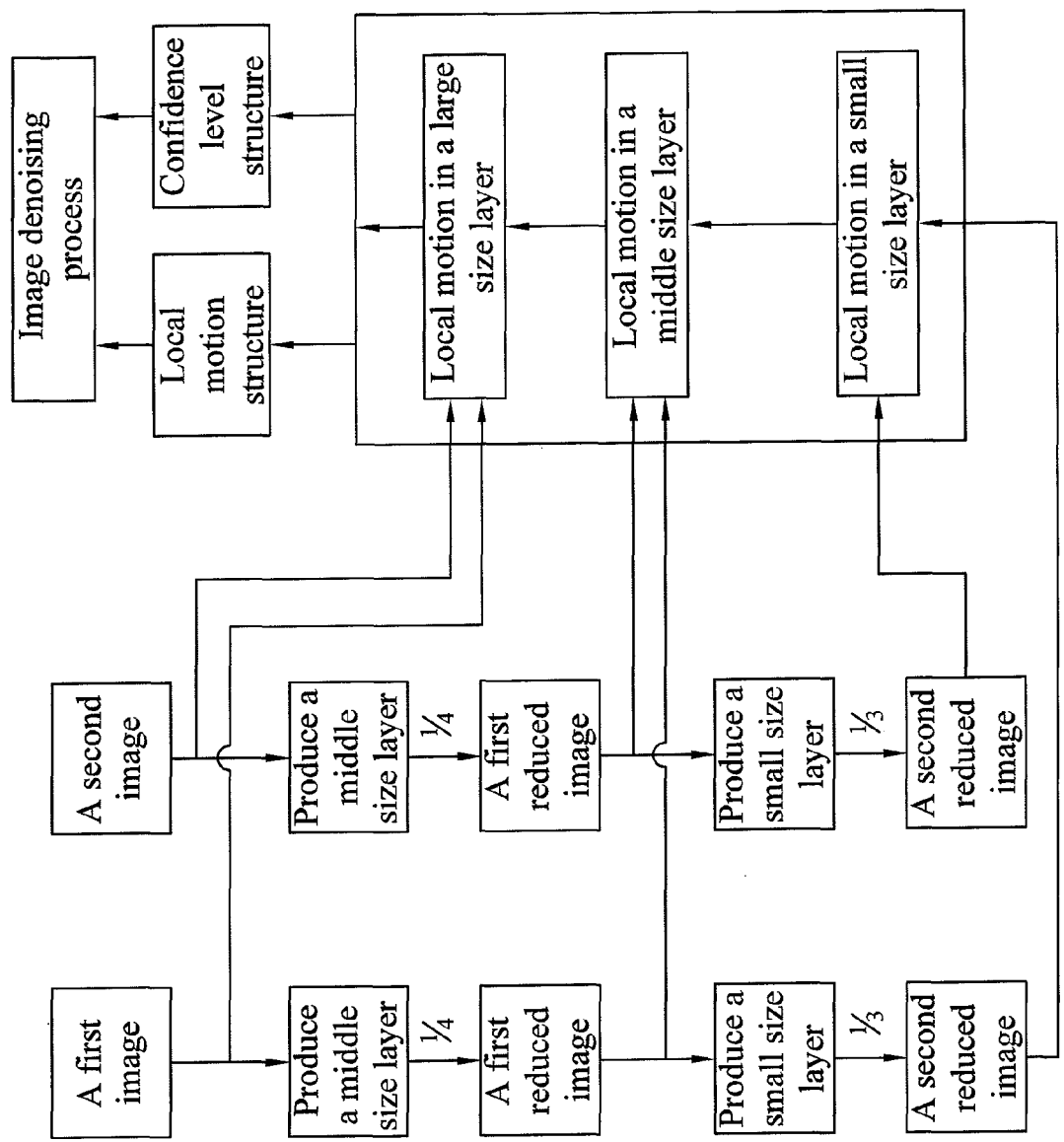
FIG. 6 is an illustrative view of the preferred embodiments of the method for making motion vector data of the present invention.
Figure 7:
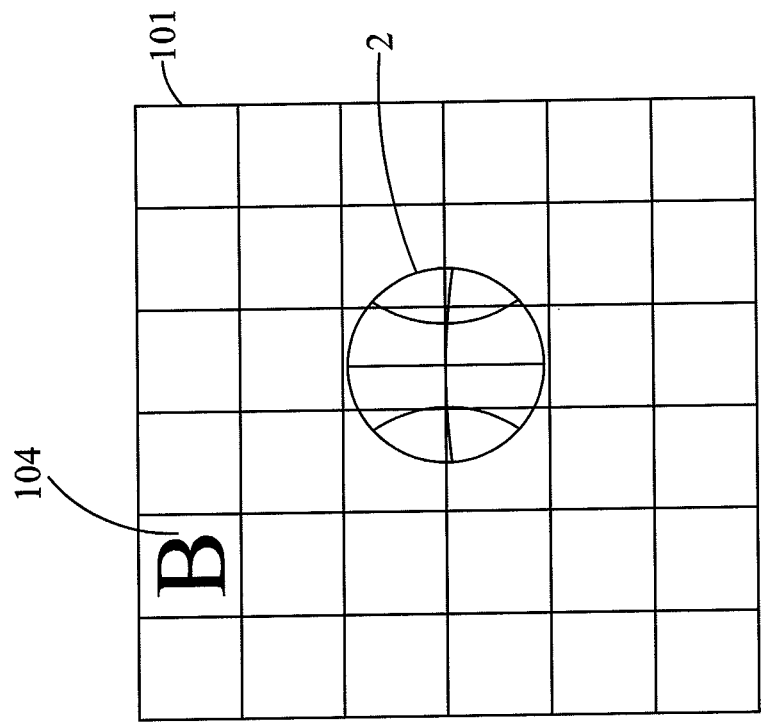
FIGS. 7-9 are three schematic diagrams of the preferred embodiments of the method for making motion vector data structure of the present invention.
Figure 7:
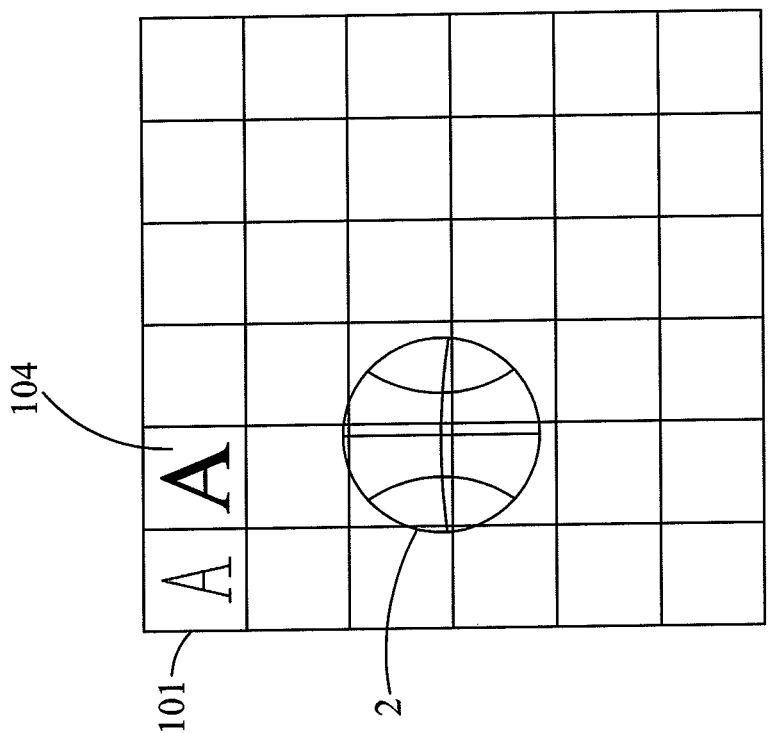
Figure 8:
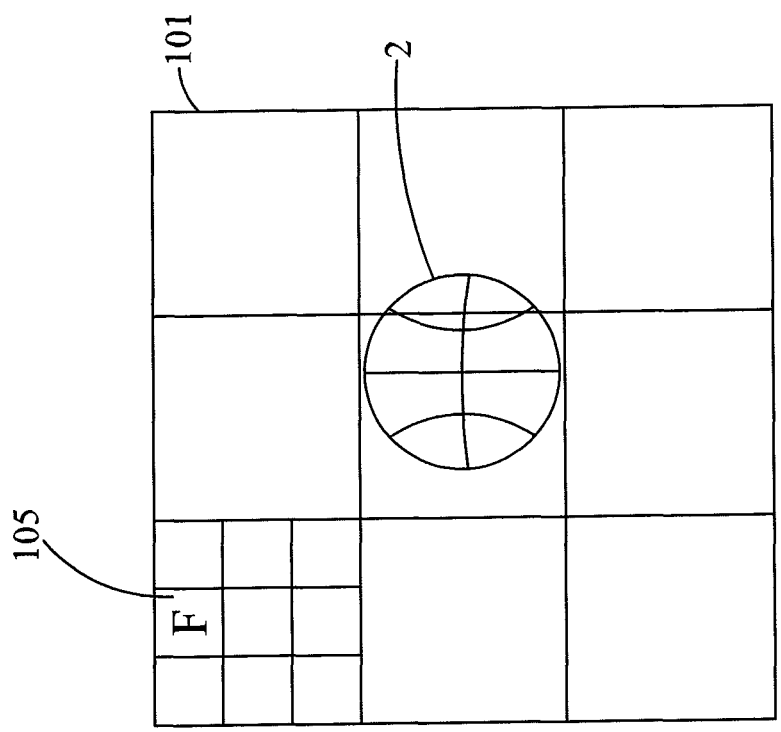
Figure 8:
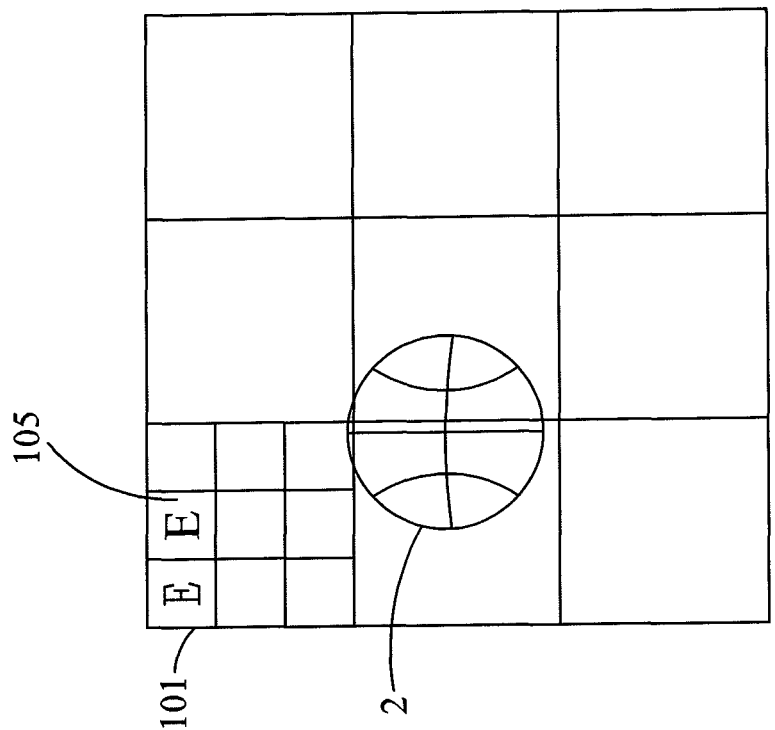
Figure 9:
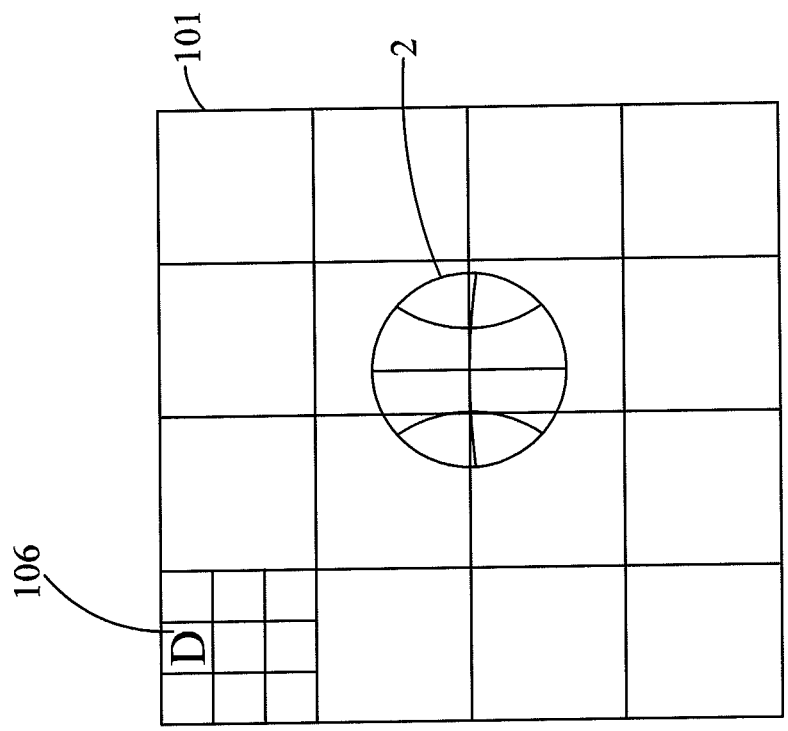
Figure 9:
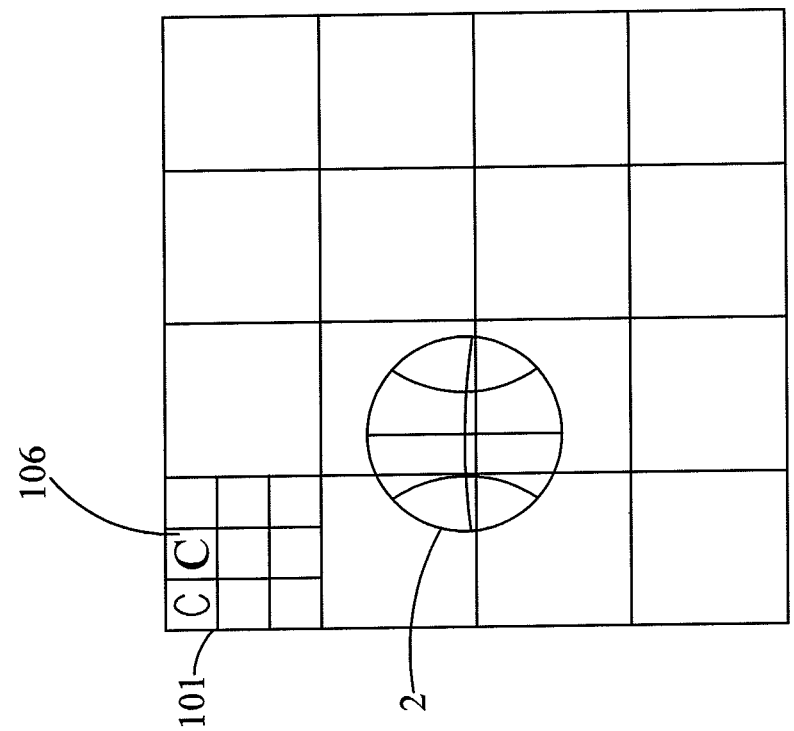

With reference to FIGS. 1-9, in which FIGS. 1-4 are the first to the fourth flow charts of the preferred embodiments of the method of making motion vector data structure of the present invention. FIG. 5 is the schematic diagram of the apparatus 1 for making motion vector data of the present invention. FIG. 6 is the illustrative view of the preferred embodiments of the method for making motion vector data of the present invention. And from FIGS. 7-9 are the first to the third schematic charts of the preferred embodiments of the method for making motion vector data structure of the present invention. As the figures show, the method of the present invention comprises the following steps:

(S10): providing an image capturing module to sequentially capture a plurality of images;

(S11): providing an image processing module to receive the plurality of images, and generating a first local motion vector based on the plurality of images in accordance with a first algorithm;

(S12): applying the image processing module to reduce size of each of the images as a first reduced image and a second reduced image respectively;

(S13): applying the image processing module to respectively divide each of the first reduced images into a plurality of first areas and to generate a second local motion vector respectively based on each of the first areas in accordance with a second algorithm;

(S14): applying the image processing module to respectively divide each of the second reduced images into a plurality of second areas and to generate a global motion vector based on each of the second areas in accordance with the second algorithm;

(S15): applying the image processing module to obtain motion vector data in the plurality of images according to the global motion vector, each of the first local motion vectors and each of the second local motion vectors.

In the present preferred embodiment, step S11 further comprises the following steps:

(S110): making a first number of times of two-dimensional direction motions toward a plurality of the first pixel A of the first image in a plurality of images respectively to generate a first location 104 corresponding to the first number of times by the image processing module;

(S111): subtracting a pixel value of each of the first pixels A disposed on each of the first location from a pixel value of each second pixel B which is corresponding to the first location 104 in a second image within the plurality of images respectively to generate a first absolute difference by the image processing module;

(S112): subtracting a coordinate of first pixel A from a coordinate of the second pixel B to generate the first local motion vector in accordance with both the first pixel A and the second pixel B corresponding to a minimum value among the first absolute differences by the image processing module.

Wherein the preferably first number of times could be $16^2$ times.

In the present preferred embodiment, step S13 further comprises the following steps:

(S130): making the first number of times of two-dimensional direction motions toward a plurality of third pixels C of each of the first areas of the first reduced image of the first image respectively to generate a second location 105 corresponding to the first number of times by the image processing module;

(S131): subtracting a pixel value of each of the third pixels C disposed on each of the second location of each of the first areas from a pixel value of each fourth pixel D which is corresponding to each of the second locations 105 of each of the first areas of the first reduced image of the second image respectively to generate a second absolute difference by the image processing module;

(S132): subtracting a coordinate of the third pixel C from a coordinate of the fourth pixel D to generate the second local motion vector in accordance with both the third pixel C and the fourth pixel D corresponding to a minimum value among the second absolute differences by the image processing module.

In the present preferred embodiment, step S14 further comprises the following steps:

(S140): making the first number of times of two-dimensional direction motions toward a plurality of fifth pixels E of each of the second areas of the second reduced image of the first image respectively to generate a third location 106 corresponding to the first number of times by the image processing module;

(S141): subtracting a pixel value of each of the fifth pixels E disposed on each of the third location of each of the second areas from a pixel value of each sixth pixel F which is corresponding to each of the third locations 106 of each of the second areas of the second reduced image of the second image respectively to generate a third absolute difference by the image processing module;

(S142): subtracting a coordinate of the fifth pixel E from a coordinate of the sixth pixel F to generate a global motion vector in accordance with both the fifth pixel E and the sixth pixel F corresponding to a minimum value among the third absolute differences by the image processing module.

Simply speaking, when the user takes a photograph of image, the image capturing module 10 sequentially captures a plurality of images 101. In the meanwhile, if an object in the image moves or the user shakes the camera to change the object's relative position on the screen of the camera, the image processing module 11 first calculates by using the first algorithm 111 with steps from S110 to S112 to generate the first local motion vectors 1111 (like the local motions in a large size layer).

Then, the image processing module 11 respectively calculates by using the second algorithm 112 with steps from S130 to S132 and from S140 to S142 to respectively generate a plurality of the second local motion vectors 1121 (like the local motions in a middle size layer) and a plurality of the global motion vectors 1122 (like the local motions in a small size layer) respectively.

Finally, the image processing module 11 obtains the motion vector data of object 2 in both the first image and the second image in accordance with the first local motion vectors 1111, each of the second local motion vectors 1121 and each of the global motion vectors 1122 and further determines the motion of the object in the image or that the user shakes the camera to change the object's relative position on the screen of the camera.

Figure 10:
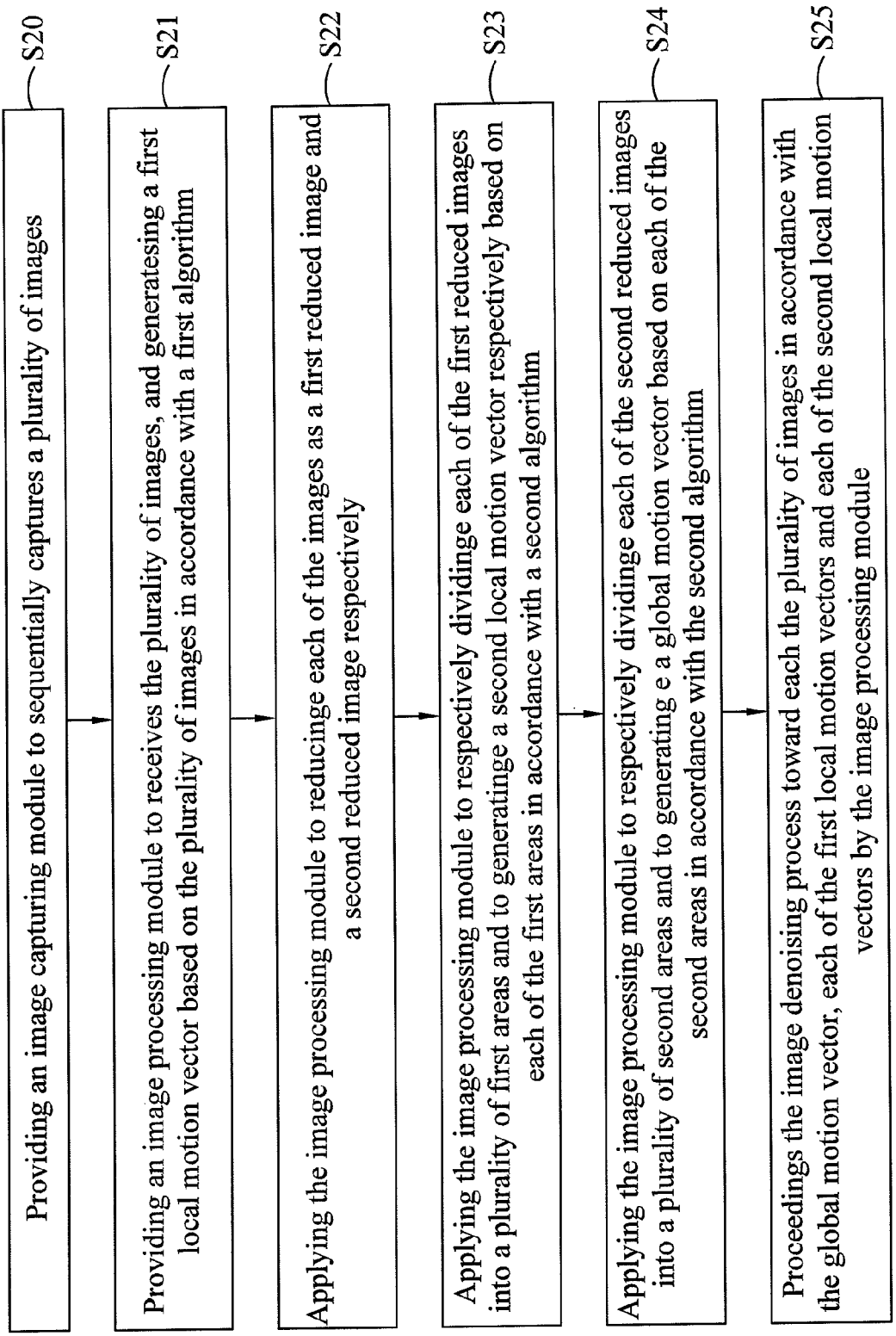
FIG. 10 is a flow chart of the preferred embodiment of the method of image denoising of the present invention.

With reference to FIG. 10, wherein the flow chart of the preferred embodiment of the method of image denoising of the present invention and with reference to FIGS. 1-9. The steps S20 to S24 of the method of the present invention are similar to steps S10 to S14 of the method described in the preferred embodiments aforementioned, the details will not be repeated. However, it is noteworthy that the method of denoising image of the present invention comprises the following steps:

(S25): proceeding the image denoising process toward each the plurality of images in accordance with the global motion vector, each of the first local motion vectors and each of the second local motion vectors by the image processing module.

For example, the image processing module obtains the motion vector data of object 2 in both the first image and the second image in accordance with the gotten data in global motion vector, each of the first local motion vectors and each of the second local motion vectors and further denoises toward the first image and the second image by proceeding the denoising process through the application of the 3D Noise Reduction provided from either the local motion structure or the confidence level structure, the super resolution image and the high dynamic range image.

In each preferred embodiment aforementioned, the method of image denoising and method of generating motion vector data structure of the present invention further comprising: employing a plurality of confidence levels and each of the confidence level respectively having a preset range which is different from each other; and classifying the plurality of the first local motion vectors or the plurality of the second local motion vectors into each of the confidence levels respectively by the image processing module to determine whether each of the first motion vectors or each of the second motion vectors is believable in accordance with different preset ranges. Wherein, the present invention could proceed above process through the confidence levels described in FIG. 6.

Generally, embodiments of the present invention employ various processes involving data stored in or transferred through one or more computers or data processing devices.

Embodiments of the present invention also relate to apparatus and systems for performing these operations. The apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will appear from the description given below.

In addition, embodiments of the present invention relate to computer program code, computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

What is claimed is:

1. A method of generating a motion vector data structure, comprising:
    providing an image capturing module to sequentially capture a plurality of images;
    providing an image processing module to receive the plurality of images, and generating a first local motion vector based on the plurality of images in accordance with a first algorithm;
    applying the image processing module to reduce size of each of the images as a first reduced image and a second reduced image respectively;
    applying the image processing module to respectively divide each of the first reduced images into a plurality of first areas and to generate a second local motion vector respectively based on each of the first areas in accordance with a second algorithm;
    applying the image processing module to respectively divide each of the second reduced images into a plurality of second areas, and to generate a global motion vector respectively based on each of the second areas in accordance with the second algorithm; and
    applying the image processing module to obtain motion vector data in the plurality of images according to the global motion vector, each of the first local motion vectors and each of the second local motion vectors.

2. The method of claim 1, further comprising the following steps of:
    making a first number of times of two-dimensional direction motions toward a plurality of first pixels of a first image in the plurality of images respectively to generate a first location corresponding to the first number of times by the image processing module;
    subtracting a pixel value of each of the first pixels disposed on each of the first locations from a pixel value of each second pixel which is corresponding to the first location in a second image within the plurality of images respectively to generate a first absolute difference by the image processing module; and
    subtracting a coordinate of the first pixel from a coordinate of the second pixel to generate the first local motion vector in accordance with both the first pixel and the second pixel corresponding to a minimum value among the first absolute differences by the image processing module.

3. The method of claim 2, further comprising the following steps of:
    making the first number of times of two-dimensional direction motions toward a plurality of third pixels of each of the first areas of the first reduced image of the first image respectively to generate a second location corresponding to the first number of times by the image processing module;
    subtracting a pixel value of each of the third pixels disposed on each of the second locations of each of the first areas from a pixel value of each fourth pixel which is corresponding to each of the second locations of each of the first areas of the first reduced image of the second image respectively to generate a second absolute difference by the image processing module; and
    subtracting a coordinate of the third pixel from a coordinate of the fourth pixel to generate the second local motion vector in accordance with both the third pixel and the fourth pixel corresponding to a minimum value among the second absolute differences by the image processing module.

4. The method of claim 2, further comprising the following steps of:
    making the first number of times of two-dimensional direction motions toward a plurality of fifth pixels of each of the second areas of the second reduced image of the first image respectively to generate a third location corresponding to the first number of times by the image processing module;
    subtracting a pixel value of each of the fifth pixels disposed on each of the third locations of each of the second areas from a pixel value of each sixth pixel which is corresponding to each of the third locations of each of the second areas of the second reduced image of the second image respectively to generate a third absolute difference by the image processing module; and
    subtracting a coordinate of the fifth pixel from a coordinate of the sixth pixel to generate a global motion vector in accordance with both the fifth pixel and the sixth pixel corresponding to a minimum value among the third absolute differences by the image processing module.

5. The method of claim 1, further comprising:
    employing a plurality of confidence levels and each of the confidence levels respectively having a preset range which is different from each other; and
    classifying the plurality of the first local motion vectors or the plurality of the second local motion vectors into each of the confidence levels respectively by the image processing module.

6. A method of image denoising, comprising the following steps:
    providing an image capturing module to sequentially capture a plurality of images;
    providing an image processing module to generate a first local motion vector based on the plurality of images in accordance with a first algorithm;

applying the image processing module to reduce size of each of the images as a first reduced image and a second reduced image respectively;

applying the image processing module to respectively divide each of the first reduced images into a plurality of first areas and generating a second local motion vector respectively based on each of the first areas in accordance with a second algorithm;

applying the image processing module to respectively divide each of the second reduced image into a plurality of second areas, and generating a global motion vector respectively based on each of the second areas in accordance with the second algorithm; and applying the image processing module to proceed a denoising process towards each the plurality of images in accordance with the global motion vector, each of the first local motion vectors and each of the second local motion vectors.

7. The method of claim 6, further comprising the following steps of:

making a first number of times of two-dimensional direction motions toward a plurality of first pixels of a first image in the plurality of images respectively to generate a first location corresponding to the first number of times by the image processing module;

subtracting a pixel value of each of the first pixels disposed on each of the first locations from a pixel value of each second pixel which is corresponding to the first location in a second image within the plurality of images respectively to generate a first absolute difference by the image processing module; and subtracting a coordinate of the first pixel from a coordinate of the second pixel to generate the first local motion vector in accordance with both the first pixel and the second pixel corresponding to a minimum value among the first absolute differences by the image processing module.

8. The method of claim 7, further comprising the following steps of:

making the first number of times of two-dimensional direction motions toward a plurality of third pixels of each of the first areas of the first reduced image of the first image respectively to generate a second location corresponding to the first number of times by the image processing module;

subtracting a pixel value of each of the third pixels disposed on each of the second locations of each of the first areas from a pixel value of each fourth pixel which is corresponding to each of the second locations of each of the first areas of the first reduced image of the second image respectively to generate a second absolute difference by the image processing module; and subtracting a coordinate of the third pixel from a coordinate of the fourth pixel to generate the second local motion vector in accordance with both the third pixel and the fourth pixel corresponding to a minimum value among the second absolute differences by the image processing module.

9. The method of claim 7, further comprising the following steps of:

making the first number of times of two-dimensional direction motions toward a plurality of fifth pixels of each of the second areas of the second reduced image of the first image respectively to generate a third location corresponding to the first number of times by the image processing module;

subtracting a pixel value of each of the fifth pixels disposed on each of the third locations of each of the second areas from a pixel value of each sixth pixel which is corresponding to each of the third locations of each of the second areas of the second reduced image of the second image respectively to generate a third absolute difference by the image processing module; and subtracting a coordinate of the fifth pixel from a coordinate of the sixth pixel to generate a global motion vector in accordance with both the fifth pixel and the sixth pixel corresponding to a minimum value among the third absolute differences by the image processing module.

10. The method of image denoising of claim 6, further comprising:

employing a plurality of confidence levels and each of the confidence levels respectively having a preset range which is different from each other; and classifying the plurality of the first local motion vectors or the plurality of the second local motion vectors into each of the confidence levels respectively by the image processing module.

* * * * *